(12) United States Patent
Murata et al.

(10) Patent No.: US 11,045,983 B2
(45) Date of Patent: Jun. 29, 2021

(54) FABRIC-LIKE MATERIAL FOR REINFORCEMENT IN URETHANE FOAM MOLDING, AND METHOD FOR PRODUCING URETHANE FOAM MOLDED BODY UTILIZING SAME

(71) Applicants: TOYOTA BOSHOKU KABUSHIKI KAISHA, Aichi-ken (JP); MOLD TECHNICAL OFFICE CO., LTD., Kanagawa-ken (JP); TOYO INK SC HOLDINGS CO., LTD, Tokyo (JP); TOYO ADL CORPORATION, Tokyo (JP); TOYOCHEM CO., LTD, Tokyo (JP)

(72) Inventors: Yoshiyuki Murata, Aichi-ken (JP); Kensuke Inuzuka, Aichi-ken (JP); Toshio Iwasawa, Kanagawa-ken (JP); Kenichi Hara, Tokyo (JP); Takafumi Senaga, Tokyo (JP)

(73) Assignees: TOYOTA BOSHOKU KABUSHIKI KAISHA, Aichi-ken (JP); MOLD TECHNICAL OFFICE CO., LTD., Kanagawa-ken (JP); TOYO INK SC HOLDINGS CO., LTD., Tokyo (JP); TOYO ADL CORPORATION, Tokyo (JP); TOYOCHEM CO., LTD., Tokyo (JP)

( * ) Notice: Subject to any disclaimer, the term of this patent is extended or adjusted under 35 U.S.C. 154(b) by 206 days.

(21) Appl. No.: 16/315,095

(22) PCT Filed: Jun. 30, 2017

(86) PCT No.: PCT/JP2017/024212
§ 371 (c)(1),
(2) Date: Jan. 3, 2019

(87) PCT Pub. No.: WO2018/008557
PCT Pub. Date: Jan. 11, 2018

(65) Prior Publication Data
US 2019/0308347 A1 Oct. 10, 2019

(30) Foreign Application Priority Data
Jul. 4, 2016 (JP) .............................. JP2016-132234

(51) Int. Cl.
*B29C 44/12* (2006.01)
*B29C 33/16* (2006.01)
(Continued)

(52) U.S. Cl.
CPC .......... *B29C 44/1271* (2013.01); *B29C 33/16* (2013.01); *B29C 39/10* (2013.01);
(Continued)

(58) Field of Classification Search
CPC ...... B29C 33/16; B29C 44/143; D06M 11/83; D06M 15/333
See application file for complete search history.

(56) References Cited

U.S. PATENT DOCUMENTS

2003/0168640 A1   9/2003  Kirsten
2009/0087601 A1*  4/2009  Kobayashi .............. C08L 77/00
                                                        428/35.4
(Continued)

FOREIGN PATENT DOCUMENTS

CN    104531002 A  *  4/2015
EP    3 189 966        7/2017
(Continued)

OTHER PUBLICATIONS

Abstract of CN 104531002 (Year: 2015).*
(Continued)

*Primary Examiner* — Marc C Howell
*Assistant Examiner* — John J DeRusso
(74) *Attorney, Agent, or Firm* — Greenblum & Bernstein, P.L.C.

(57) ABSTRACT

A fabric-like material for reinforcement in an urethane foam molding is obtained by impregnating a part of a surface of a nonwoven fabric of organic fibers with a hot melt magnetic material and immobilizing the hot melt magnetic material. The hot melt magnetic material satisfies compositions described below and has a softening point of 70 to 100° C.

Ethylene-vinyl acetate copolymer (A): 10 to 95% by mass.
Wax (B): 0 to 30% by mass.
Magnetic powder (C): 5 to 70% by mass.
(The total of (A), (B) and (C) is 100% by mass.).

6 Claims, 1 Drawing Sheet

(51) Int. Cl.
| D06M 11/83 | (2006.01) |
| D06M 13/02 | (2006.01) |
| D06M 15/227 | (2006.01) |
| D06M 15/333 | (2006.01) |
| B29C 70/88 | (2006.01) |
| B29C 44/00 | (2006.01) |
| B29K 75/00 | (2006.01) |
| D06M 23/08 | (2006.01) |
| C08J 5/04 | (2006.01) |
| B29C 39/10 | (2006.01) |
| B29L 31/30 | (2006.01) |

(52) U.S. Cl.
CPC ............. *B29C 44/00* (2013.01); *B29C 70/88* (2013.01); *C08J 5/04* (2013.01); *D06M 11/83* (2013.01); *D06M 13/02* (2013.01); *D06M 15/227* (2013.01); *D06M 15/333* (2013.01); *D06M 23/08* (2013.01); *B29K 2075/00* (2013.01); *B29K 2713/00* (2013.01); *B29L 2031/30* (2013.01)

(56) References Cited

U.S. PATENT DOCUMENTS

| 2009/0277566 A1 | 11/2009 | Lawrence et al. |
| 2014/0363611 A1* | 12/2014 | Yoshida .................. C08K 3/38 428/95 |
| 2015/0061173 A1 | 3/2015 | Murata et al. |
| 2016/0039154 A1 | 2/2016 | Mogi |

FOREIGN PATENT DOCUMENTS

| JP | 2001-252930 | 9/2001 |
| JP | 2004-506065 | 2/2004 |
| JP | 2006-241637 | 9/2006 |
| JP | 2013-082184 | 5/2013 |
| JP | 2015-048544 | 3/2015 |
| JP | 2016-036463 | 3/2016 |
| JP | 2016-050372 | 4/2016 |

OTHER PUBLICATIONS

Translation of CN 104531002 (Year: 2015).*
International Search Report in International Patent Application No. PCT/JP2017/024212, dated Sep. 19, 2017 (with English-language translation).
English translation of previously cited SENBA, Mitsuru et al., EVA Nano Composite no Tokusei, Toso Kenkyu Gijutsu, 2010, pp. 41-46, vol. 54, particularly Fig. 4. URL:http://www.tosoh.co.jp/technology/assets/2010_03_02.pdf.

* cited by examiner

FABRIC-LIKE MATERIAL FOR REINFORCEMENT IN URETHANE FOAM MOLDING, AND METHOD FOR PRODUCING URETHANE FOAM MOLDED BODY UTILIZING SAME

CROSS-REFERENCE TO RELATED APPLICATIONS

The present application is a National Phase entry of, and claims priority to, PCT Application No. PCT/JP2017/024212, filed Jun. 30, 2017, which claims priority to Japanese Patent Application No. 2016-132234, filed Jul. 4, 2016, which is incorporated by reference herein in their entireties for all purposes.

STATEMENT REGARDING FEDERALLY SPONSORED RESEARCH OR DEVELOPMENT

Not applicable.

BACKGROUND

The present disclosure relates to fabric-like materials for reinforcement in an urethane foam molding and methods for producing an urethane foam molded body utilizing same.

A usual urethane foam molded body used for a cushion material in a vehicle or the like is integrally molded with a fabric-like material for reinforcement such as cheesecloth or nonwoven fabric in order to prevent a leakage of an urethane resin during foam molding, so as to inhibit abnormal noise generation caused by contact with a metal spring, and to protect the urethane member. In manufacture of the urethane foam molded body, the fabric-like material for reinforcement, which is obtained by cutting and sewing an original fabric of the fabric-like material for reinforcement based on a shaping mold for an urethane foam molded body, is temporarily fixed to the shaping mold and then is integrated by foam molding by injection of liquid urethane composition.

Japanese Laid-Open Patent Publication No. 2015-48544 discloses a method for temporarily fixing the fabric-like material for reinforcement to the shaping mold due to magnetic force between permanent magnets and a hot melt magnetic material containing a magnetic material. The permanent magnets are buried in a plurality of places of the shaping mold for the urethane foam molded body. The hot melt magnetic material is immobilized in such a state that the fabric-like material for reinforcement is partially impregnated with the hot melt magnetic material. The hot melt magnetic material corresponds to a hot melt adhesive agent containing the magnetic material such as ferrite and thermoplastic resin. Thus, the hot melt magnetic material has magnetism and properties of being solid at normal temperature and becoming liquid to get a fluidity by heating.

In the case of the method disclosed in Japanese Laid-Open Patent Publication No. 2015-48544, because the hot melt magnetic material is immobilized in the fabric-like material for reinforcement in the state that the fabric-like material for reinforcement is impregnated with the hot melt magnetic material, there is an advantage that position displacement and peeling of the hot melt magnetic material hardly occur during transport and setting on the shaping mold. However, the hot melt magnetic material immobilized in the fabric-like material for reinforcement has a low flexibility, so that it is difficult in some cases to temporarily fix the fabric-like material for reinforcement on the shaping mold in a state where the hot melt magnetic material is disposed along curved surfaces of the shaping mold.

Therefore, there has been a need for improved fabric-like materials for reinforcement in an urethane foam molding and improved methods for producing urethane foam molded body utilizing the fabric-like materials.

BRIEF SUMMARY

In one aspect of the present disclosure, a fabric-like material for reinforcement in an urethane foam molding, which is obtained by impregnating a part of a surface of a nonwoven fabric of organic fibers with a hot melt magnetic material and immobilizing the hot melt magnetic material, is characterized in that the hot melt magnetic material satisfies compositions described below, while having a softening point of 70 to 100° C.

Ethylene-vinyl acetate copolymer (A): 10 to 95% by mass.
Wax (B): 0 to 30% by mass.
Magnetic powder (C): 5 to 70% by mass.
(The total of (A), (B) and (C) is 100% by mass.)

In another aspect of the present disclosure, a method for producing an urethane form molded body utilizing the fabric-like material for reinforcement in urethane foam molding has a setting step for fixing the fabric-like material for reinforcement in urethane foam molding on a molding surface of the shaping mold, which contains magnets buried in some predetermined positions, due to magnetic force, an urethane foam molding step for injecting urethane resin into the shaping mold and foaming the urethane resin to integrally mold the urethane resin with the fabric-like material for reinforcement in urethane foam molding, and a mold release step for removing an urethane foam molded body obtained by foam molding from the shaping mold.

DETAILED DESCRIPTION

Figure 1:
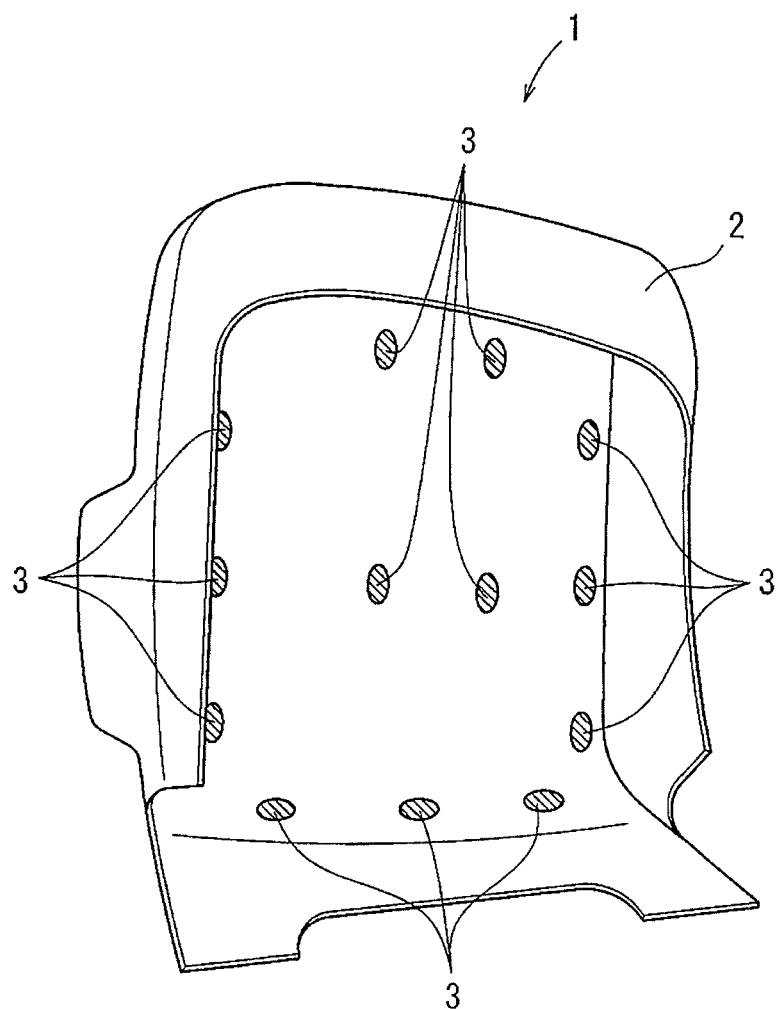
FIG. 1 is a plan view showing an embodiment of a fabric-like material for reinforcement in an urethane foam molding of the present disclosure.

A fabric-like material for reinforcement in an urethane foam molding of the present disclosure is obtained by impregnating a part of a surface of an nonwoven fabric of organic fibers with a hot melt magnetic material that contains magnetic powder and immobilizing the hot melt magnetic material.

The nonwoven fabric used for the fabric-like material for reinforcement in urethane foam molding may be made of organic fibers and may have the weight of 50-200 g/m². The weight of the nonwoven fabric is preferably 80 to 175 g/m². When the weight is less than 50 g/m², an urethane resin injected during the urethane foam molding tends to leak, so that there are some cases where abnormal noises occur due to contact between a metal spring and the urethane resin. When the weight is more than 200 g/m², creases are often generated during molding. The kind and the thickness of the organic fiber used for the nonwoven fabric are not limited especially. For example, polyester fabric such as polyethylene terephthalate and polybutylene terephthalate, polyolefin fiber such as polyethylene and polypropylene (which may be copolymer such as homo-, random-), polyamide fiber and the like may be used. Only one kind of organic fiber may be used, and two or more kinds of organic fibers may be combined. In particular, polyester fiber, polypropylene fiber, polyethylene fiber, low-melting polyester fiber having the melting point of 110 to 160° C., and bi-component fiber such as polyester/polyethylene, polyester/low-melting polyester or polypropylene/polyethylene are preferable. The organic fibers may have the thickness of about 5 µm to about 30 µm, or the fineness of about 1 dtex to about 33 dtex. The nonwoven fabric is not limited to a monolayer fabric and may be a multilayer fabric obtained by laminating the nonwoven fabrics.

The hot melt magnetic material corresponds to a hot melt adhesive agent containing magnetic powder and a thermoplastic resin and having properties of being solid at normal temperature and becoming liquid to get a fluidity by heating and magnetism capable of attracting a magnet. The hot melt magnetic material contains an ethylene-vinyl acetate copolymer (A) as the thermoplastic resin and magnetic powder (C), and optionally includes wax (B).

The amount of the ethylene-vinyl acetate copolymer (A) is 10 to 95% by mass based on 100% by mass of the total of (A), (B) and (C), depending on the melt peak temperature and the melt flow rate of the ethylene-vinyl acetate copolymer (A). The amount of the ethylene-vinyl acetate copolymer (A) is preferably 15% or more by mass, more preferably 20% or more by mass, and most preferably 30% or more by mass. In addition, the amount of the ethylene-vinyl acetate copolymer (A) is preferably 80% or less by mass, more preferably 70% or less by mass, and most preferably 60% or less by mass. When the amount of the ethylene-vinyl acetate copolymer (A) is less than 10% by mass, the melt viscosity tends to be low, so that it is difficult for the hot melt magnetic material to achieve sufficient flocculation force. When the amount of the ethylene-vinyl acetate copolymer (A) is more than 95% or more by mass, the melt viscosity of the hot melt magnetic material is too high, so that discharge performance of the hot melt magnetic material from an applicator is often bad. Furthermore, since the content of the magnetic powder (C) is small, sufficient magnetic performance attracting a magnet cannot be obtained.

The melt peak temperature of the ethylene-vinyl acetate copolymer (A) is 50 to 75° C., preferably 50 to 70° C., and more preferably 55 to 70° C. When the melt peak temperature is less than 50° C., insufficient heat resistance of the hot melt magnetic material occurs. When the melt peak temperature is more than 75° C., the hot melt magnetic material cannot be bent along curved surfaces of the shaping mold due to the lack of the flexibility of the hot melt magnetic material.

The melt flow rate of the ethylene-vinyl acetate copolymer (A) is 0.1 to 2500 g/10 min., preferably 10 to 2000 g/10 min., and more preferably 20 to 1500 g/10 min. The melt flow rate is measured based on JIS K7210 and corresponds to a flow rate (g/10 min.) during 10 minutes under a condition where the temperature is 190° C. and the load is 2.16 kg.

The flexural modulus of the ethylene-vinyl acetate copolymer (A) is 30 MPa or less. Since the flexural modulus is desirably low so as to provide the followability to the curved surfaces of the shaping mold, the flexural modulus is preferably 25 MPa or less, more preferably 20 MPa or less, and much more preferably 10 MPa or less. The flexural modulus is measured based on JIS K7116.

The content of vinyl acetate in the ethylene-vinyl acetate copolymer (A) is 5 to 45% by mass. That is, the ethylene-vinyl acetate copolymer (A) is obtained by copolymerizing a composition containing 5 to 45% by mass of vinyl acetate relative to 100% by mass of the total of ethylene and vinyl acetate. The amount of vinyl acetate is desirably large so as to provide the followability to the curved surfaces of the shaping mold. The amount of vinyl acetate is preferably 10% or more by mass, more preferably 15% or more by mass, and most preferably 20% or more by mass. In addition, the amount of vinyl acetate is preferably 45% or less by mass, more preferably 40% or less by mass, and most preferably 30% or less by mass.

The wax (B) may be carnauba wax, candelilla wax, montan wax, paraffin wax, microcrystalline wax, Fischer Tropsch wax, polyethylene wax, polypropylene wax, each oxide of these waxes, ethylene-acrylic acid copolymer wax, ethylene-methacrylic acid copolymer wax or the like. Only one kind of these waxes may be used, and two or more kinds of these may be combined The amount of the wax (B) is 0 to 30% by mass relative to 100% by mass of the total of (A), (B) and (C). The amount of the wax (B) is preferably 3% or more by mass, and more preferably 5% or more by mass. In addition, the amount of wax (B) is preferably 20% or less by mass, and more preferably 15% or less by mass. When the amount is within the range, the hot melt magnetic material has good flexibility, followability to the curved surface of the shaping mold when set on the shaping mold, and heat resistance. Thus, it is preferable that the amount of the wax (B) is within the range.

The wax (B) is added for improving the fluidity and the heat resistance of the hot melt magnetic material. The wax (B) is a low viscosity material having the molecular weight less than 1,000 such that it is difficult to measure the melt flow rate of the wax (B) based on JIS K7210. The kinematic viscosity of the wax (B) is preferably 30 $mm^2/s$ or less, more preferably 20 $mm^2/s$ or less, and most preferably 10 $mm^2/s$.

The melting point of the wax (B) is 70 to 160° C. Because the melting point of the wax (B) is desirably high for providing the heat resistance of the hot melt magnetic material, the melting point of the wax (B) is preferably 80 to 150° C., more preferably 90 to 140° C., and much preferably 100 to 130° C. The melting point is measured based on JIS K2235.

The magnetic powder (C) may be a powdered magnetic material having ferromagnetism, for example, iron, nickel, cobalt, alloy of these metals, ferrite, rare earth metal such as gadolinium, Heusler alloy, manganese alloy such as $Cu_2MnAl$, compound of $CrO_2$, $CrBr_3$ or $ZrZn_2$, etc. The particle size of the magnetic powder (C) may be 15 to 500 µm, and preferably 50 to 300 µm. When the particle size is less than 15 µm, the hot melt magnetic material soaking into and immobilized in the fabric-like material for reinforcement in urethane foam molding has weak magnetic force attracting magnets of the shaping mold such that crease, slack or displacement of the fabric-like material for reinforcement often occurs during molding. When the particle size is more than 500 µm, there are some cases where it is difficult to obtain a uniform hot melt magnetic material because dispersion of the magnetic powder (C) tends to be insufficient and the sedimentation speed of the magnetic powder is fast in manufacture of the hot melt magnetic material.

The amount of the magnetic powder (C) is 5 to 70% by mass relative to 100% by mass of the total of (A), (B) and (C). The amount of the magnetic powder (C) is preferably 10% or more by mass, and/or 50% or less by mass. When the magnetic powder (C) is less than 5% by mass, force attracting magnets is weak such that temporary fastening of the fabric-like material for reinforcement is often insufficient during molding. As a result, there are many cases where crease, slack or displacement of the fabric-like material for reinforcement occurs during molding. When the magnetic powder (C) is more than 70%, the total amount of the ethylene-vinyl acetate copolymer (A) and the wax (B) is small such that it is difficult to obtain a uniform hot melt magnetic material.

The hot melt magnetic material may contain 5 to 30% by mass of additives, such as glass filler, silica fiber, or liquid paraffin with respect to 100% by mass of the total of (A), (B) and (C) in order to improve dispersiveness and fluidity of the magnetic powder (C) unless magnetic properties attracting the magnets buried in the shaping mold are not spoiled.

The viscosity of the hot melt magnetic material at 150° C. is 2,000 to 200,000 mPa·s, preferably 5,000 to 100,000 mPa, and more preferably 10,000 to 50,000 mPa·s. When the viscosity of the hot melt magnetic material is less than 2,000 mPa·s, the magnetic powder (C) settles in a short time such that it is difficult to prepare a uniform hot melt magnetic material. When the viscosity of the hot melt magnetic material is more than 200,000 mPa·s, discharge performance of the hot melt magnetic material from the applicator is bad, and the hot melt magnetic material tends to have a property of hardly soaking into the fabric-like material for reinforcement.

The softening point of the hot melt magnetic material is 70 to 100° C. The softening point is preferably is 80 to 100° C., and most preferably 85 to 95° C. When the softening point is less than 70° C., the hot melt magnetic material melts during molding because a normal molding temperature of the urethane foam molded body is 60 to 80° C. When the softening point is more than 100° C., the hot melt magnetic material often has a property that it is difficult to soak into the fabric-like material for reinforcement. The softening point corresponds to a temperature measured according to the method defined as JIS K6863.

Figure 2:
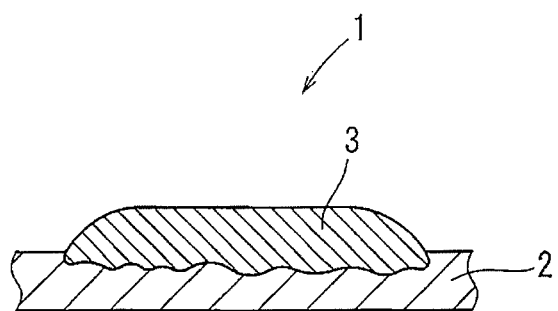
FIG. 2 is an enlarged cross-sectional view of the embodiment of the fabric-like material for reinforcement in urethane foam molding of the present disclosure.

As shown in FIGS. 1 and 2, a fabric-like material 1 for reinforcement in urethane foam molding according to one embodiment is obtained by impregnating a part of a surface of nonwoven fabric 2 of organic fibers with a hot melt magnetic material 3 and immobilizing the hot melt magnetic material 3. A condition of impregnation and immobilization means to be immobilized by applying or dropping the hot melt magnetic material 3, which is melt to be in a liquid state by heating, on surfaces of specific locations of the nonwoven fabric 2, waiting for penetration of the liquid hot melt magnetic material 3 to the inside of the nonwoven fabric 2, and solidifying the hot melt magnetic material 3 by air-drying or cooling. In that case, the surface where the hot melt magnetic material 3 is applied or dropped is a predetermined surface of the nonwoven fabric 2. When the multi-layered nonwoven fabric 2 is used, the liquid hot melt magnetic material 3 applied or dropped on a top layer of the nonwoven fabric 2 may permeate a lower layer of the nonwoven fabric 2 and be immobilized therein.

The hot melt magnetic material is obtained by dispersedly mixing a thermoplastic resin (ethylene-vinyl acetate copolymer), a mineral oil-based softening agent, wax and magnetic powder in an extruder, and extruding this melted mixture from a tip nozzle of the extruder. Alternatively, the magnetic powder is mixed and dispersed into a melted composition of the thermoplastic resin, the mineral oil-based softening agent and the wax by using a melting pot having a mixture. It may be formed in various shapes, such as granular shape, thread shape, fibrous shape, rod-like shape, or planar shape for fitting with positions and various shapes of a seat shaping mold on which the fabric-like material for reinforcement is attached. In addition, the planar shape is preferably film shape, sheet shape, net shape, or fabric-like shape. When it is formed in the granular shape, a popular strand cutter method is used. When it is formed in the rod-like shape, the hot melt magnetic material is cut into a predetermined length after cooling. When it is formed in the thread shape, the hot melt magnetic material is wound up by a reel according to a general spinning method. When it is formed in the film or the sheet shape, a typical T-die method is used. When it is formed in a tape-like shape, the film or the sheet is slit and wound. When it is formed in the fabric-like shape, especially nonwoven fabric-like shape, the same method with a manufacture method of a hot melt nonwoven fabric may be used under a condition where a porous nozzle for producing the hot melt nonwoven fabric is attached to the tip of the extruder.

The hot melt magnetic material is melt and fluidized by energy such as heat or ultrasonic waves, and thus can soak into a fiber layer of the fabric-like material for reinforcement. And, it is easy to shape the hot melt magnetic material into a desired shape based on a mold used during cooling. Thus, it is able to immobilize the magnetic material in a desired shape at a target position of the fabric-like material for reinforcement. Impregnation of the nonwoven fabric with the hot melt magnetic material and immobilization of the hot melt magnetic material are carried out by following methods or the like. A first method includes setting an original fabric of nonwoven fabric, disposing the hot melt magnetic material having the predetermined size and amount at predetermined positions on the fabric, heating the hot melt magnetic material with a heating plate such as iron to melt the hot melt magnetic material and impregnate the nonwoven fabric with the hot melt magnetic material, and pressing and cooling the hot melt magnetic material with a cold metal rod or the like to immobilize the hot melt magnetic material. A second method includes disposing the predetermined size and amount of the hot melt magnetic material at predetermined positions of the shaping mold, setting nonwoven fabric on the shaping mold, heating the hot melt magnetic material from the above the nonwoven fabric with a heating plate such as iron to melt the hot melt magnetic material and impregnate the nonwoven fabric with the hot melt magnetic material, and pressing and cooling the hot melt magnetic material with a cold metal rod or the like to immobilize the hot melt magnetic material. In this case, it is preferable to provide a Teflon film as separating material between the hot melt magnetic material and a heat source during the heating step. A third method contains melting the granular hot melt magnetic material, applying the hot melt magnetic material to predetermined positions of nonwoven fabric while extruding the hot melt magnetic material from an outlet nozzle of a hot melt applicator, which is used for T-die method, spray method or gravure roll transfer method, into a tape shape, a fiber shape, a dot shape, a cotton shape or a net shape, and cooling the hot melt magnetic material to immobilize it.

A method for producing the urethane foam molded body utilizing the third method will be described in more detail. A roughly cut sheet-like nonwoven fabric is fastened on a metal mold having a plurality of vent holes communicating an outer surface with an interior space. The metal mold is covered with a heat resistance film, and then the interior of the film is heated with high temperature steam. Then, the pressure in the interior of the film is decreased so as to transfer the shape of the metal mold to the sheet-like nonwoven fabric. After cooling the metal mold, the shaped nonwoven fabric is removed from the metal mold. The tape-shaped hot melt magnetic material extruded from the outlet nozzle of the T-die type hot melt applicator is applied to predetermined positions of the shaped nonwoven fabric and then is cooled to be immobilized. The nonwoven fabric, predetermined positions of which the hot melt magnetic material is immobilized at, is set in a cavity of an urethane foam shaping mold, predetermined positions of which magnets are buried in. Foam molding is carried out by injecting a liquid urethane composition into the cavity, and then an urethane foam molded body is released from the shaping mold.

Embodiment

Next, concrete examples and comparative examples of the present disclosure will be described. However, the present disclosure is not limited to these.

<Preparation of Hot Melt Magnetic Material>

The ethylene-vinyl acetate copolymer (A), the wax (B) if needed, and additives were mixed in a Henshel-type mixer for 5 minutes. The mixture was transferred to a hopper and then was fed to an extruder by using a screw feeder. Furthermore, the magnetic powder (C) was added into the extruder in a predetermined ratio by using another screw feeder to obtain a hot melt magnetic material. The following tables 1 and 2 show the kind and the amount of each component.

Extruder: same direction rotating twin shaft screw extruder PMT32-40.5 made by IKG Corporation Barrel temperature: 100° C. (supply opening 80° C.) (adjusted if needed)

Screw rotating speed: 100 rpm

Feed speed: 5 kg/hr

<Manufacture of Fabric-Like Material for Reinforcement in Urethane Foam Molding>

The prepared hot melt magnetic material was formed into a disk shape having a diameter of 15 mm (weight: 0.4 to 0.6 g) and was placed on a stand made of iron. The hot melt magnetic material was covered with nonwoven fabric of organic fibers, and a Teflon (R) film for separation was put on the nonwoven fabric. The hot melt magnetic material was heated and melted by pressing the film from above for 3 seconds with an iron, temperature of which was controlled at 150° C. by using a temperature control dial, so as to liquidize the hot melt magnetic material and to impregnate the nonwoven fabric with the hot melt magnetic material. Then, the hot melt magnetic material was cooled with a cold rod in order to obtain a fabric-like material for reinforcement in urethane foam molding.

Nonwoven fabric of organic fibers: single-layered dry nonwoven fabric having 140 g/m² weight, which was made using a carding method from mixed fiber containing 70% by mass of polyester short fiber (fineness 2.2 dtex) and 30% by mass of bi-component short fiber (fineness 2.2 dtex) of polyethylene and polypropylene

TABLE 1

| | | kind | content of vinyl acetate (%) | melting point (° C.) | 1 M-1 | 2 M-2 | 3 M-3 | 4 M-4 | 5 M-5 | 6 M-6 | 7 M-7 |
|---|---|---|---|---|---|---|---|---|---|---|---|
| ethylene- | A-1 | ultrasen760 | 42% | 50 | 50 | | | | | | |
| vinyl acetate | A-2 | ultrasen 722 | 28% | 58 | | 50 | | | | | |
| copolymer | A-3 | ultrasen 720 | 28% | 59 | | | 50 | | | | 30 |
| (A) | A-4 | ultrasen 751 | 28% | 65 | | | | 50 | | | |
| | A-5 | ultrasen 681 | 20% | 72 | | | | | 50 | | |
| | A-6 | ultrasen 633 | 20% | 78 | | | | | | 50 | |
| | A-7 | ultrasen 631 | 20% | 80 | | | | | | | |
| | A-8 | ultrasen 638 | 20% | 82 | | | | | | | |
| | A-9 | ultrasen 625 | 15% | 92 | | | | | | | |
| | A-10 | ultrasen 541 | 10% | 94 | | | | | | | |
| wax (B) | B-1 | sasol H1 | | 110 | 10 | 10 | 10 | 10 | 10 | 10 | 30 |
| | B-2 | high wax NL800 | | 105 | | | | | | | |
| | B-3 | biscol 660-P | | 145 | | | | | | | |
| magnetic | C-1 | JIP 300A-120 | | | 40 | 40 | 40 | 40 | 40 | 40 | 40 |
| powder (C) | C-2 | C-100 | | | | | | | | | |
| additive | | antioxidant | | | 0.1 | 0.1 | 0.1 | 0.1 | 0.1 | 0.1 | 0.1 |
| | | antiblocking agent | | | 0.1 | 0.1 | 0.1 | 0.1 | 0.1 | 0.1 | 0.1 |
| properties of magnetic material | | melt viscosity at 150° C. | | | 120000 | 40000 | 80000 | 150000 | 60000 | 130000 | 60000 |
| | | softening point (° C.) | | | 92 | 80 | 70 | 78 | 76 | 84 | 72 |
| evaluation of fabric-like material | | spreadability of resin | | | ○ | ○ | ○ | ○ | △ | △ | ○ |
| | | attracting ability to magnet | | | ○ | ○ | ○ | ○ | ○ | ○ | ○ |
| | | heat resistance | | | ○ | ○ | ○ | ○ | ○ | ○ | △ |
| | | followability along curved surface | | | ○ | ○ | ○ | ○ | △ | △ | △ |
| | | integrating ability (immobilization force) | | | ○ | ○ | ○ | ○ | ○ | ○ | ○ |

| | | kind | content of vinyl acetate (%) | melting point (° C.) | 8 M-8 | 9 M-9 | 10 M-10 | 11 M-11 | 12 M-12 | 13 M-13 | 14 M-14 |
|---|---|---|---|---|---|---|---|---|---|---|---|
| ethylene- | A-1 | ultrasen760 | 42% | 50 | 60 | | | | | | |
| vinyl acetate | A-2 | ultrasen 722 | 28% | 58 | | 75 | 30 | 50 | 50 | | 25 |
| copolymer | A-3 | ultrasen 720 | 28% | 59 | | | | | | | |
| (A) | A-4 | ultrasen 751 | 28% | 65 | | | | | | | |
| | A-5 | ultrasen 681 | 20% | 72 | | | | | | 50 | |
| | A-6 | ultrasen 633 | 20% | 78 | | | | | | | 25 |
| | A-7 | ultrasen 631 | 20% | 80 | | | | | | | |
| | A-8 | ultrasen 638 | 20% | 82 | | | | | | | |
| | A-9 | ultrasen 625 | 15% | 92 | | | | | | | |
| | A-10 | ultrasen 541 | 10% | 94 | | | | | | | |

TABLE 1-continued

| | | | | | | | | | | |
|---|---|---|---|---|---|---|---|---|---|---|
| wax (B) | B-1 | sasol H1 | 110 | | 15 | 3 | | | 15 | 15 |
| | B-2 | high wax NL800 | 105 | | | | 10 | | | |
| | B-3 | biscol 660-P | 145 | | | | | 10 | | |
| magnetic powder (C) | C-1 | JIP 300A-120 | | 40 | 10 | 67 | 40 | 40 | | 35 |
| | C-2 | C-100 | | | | | | | 35 | |
| additive | | antioxidant | | 0.1 | 0.1 | 0.1 | 0.1 | 0.1 | 0.1 | 0.1 |
| | | antiblocking agent | | 0.1 | 0.1 | 0.1 | 0.1 | 0.1 | 0.1 | 0.1 |
| properties of magnetic material | | melt viscosity at 150° C. | | 18000 | 58000 | 20000 | 39000 | 42000 | 42000 | 82000 |
| | | softening point (° C.) | | 86 | 98 | 85 | 84 | 80 | 91 | 90 |
| evaluation of fabric-like material | | spreadability of resin | | Δ | ○ | ○ | ○ | ○ | ○ | ○ |
| | | attracting ability to magnet | | ○ | ○ | ○ | ○ | ○ | ○ | ○ |
| | | heat resistance | | Δ | ○ | ○ | ○ | ○ | ○ | ○ |
| | | followability along curved surface | | ○ | ○ | ○ | ○ | ○ | ○ | ○ |
| | | integrating ability (immobilization force) | | ○ | ○ | ○ | ○ | ○ | ○ | ○ |

TABLE 2

| | kind | | content of vinyl acetate (%) | melting point (° C.) | 1 M-15 | 2 M-16 | 3 M-17 | 4 M-18 | 5 M-19 |
|---|---|---|---|---|---|---|---|---|---|
| ethylene-vinyl acetate copolymer (A) | A-1 | ultrasen760 | 42% | 50 | | | | | |
| | A-2 | ultrasen 722 | 28% | 58 | | | | | |
| | A-3 | ultrasen 720 | 28% | 59 | | | | | |
| | A-4 | ultrasen 751 | 28% | 65 | | | | | 20 |
| | A-5 | ultrasen 681 | 20% | 72 | | | | | |
| | A-6 | ultrasen 633 | 20% | 78 | | | | | |
| | A-7 | ultrasen 631 | 20% | 80 | 50 | | | | |
| | A-8 | ultrasen 638 | 20% | 82 | | 50 | | | |
| | A-9 | ultrasen 625 | 15% | 92 | | | 50 | 50 | |
| | A-10 | ultrasen 541 | 10% | 94 | | | | 50 | |
| wax (B) | B-1 | sasol H1 | | 110 | 10 | 10 | 10 | 10 | 40 |
| | B-2 | high wax NL800 | | 105 | | | | | |
| | B-3 | biscol 660-P | | 145 | | | | | |
| magnetic powder (C) | C-1 | JIP 300A-120 | | | 40 | 40 | 40 | 40 | 40 |
| | C-2 | C-100 | | | | | | | |
| additive | | antioxidant | | | 0.1 | 0.1 | 0.1 | 0.1 | 0.1 |
| | | antiblocking agent | | | 0.1 | 0.1 | 0.1 | 0.1 | 0.1 |
| properties of magnetic material | | melt viscosity at 150° C. | | | 140000 | 135000 | 155000 | 120000 | 70000 |
| | | softening point (° C.) | | | 133 | 141 | 140 | 150< | 50 |
| evaluation of fabric-like material | | spreadability of resin | | | Δ | Δ | Δ | Δ | ○ |
| | | attracting ability to magnet | | | ○ | ○ | ○ | ○ | Δ |
| | | heat resistance | | | ○ | ○ | ○ | ○ | x |
| | | followability along curved surface | | | x | x | x | x | x |
| | | integrating ability (immobilization force) | | | ○ | ○ | ○ | ○ | x |

| | kind | | content of vinyl acetate (%) | melting point (° C.) | 6 M-20 | 7 M-21 | 8 M-22 | 9 M-23 |
|---|---|---|---|---|---|---|---|---|
| ethylene-vinyl acetate copolymer (A) | A-1 | ultrasen760 | 42% | 50 | | | | |
| | A-2 | ultrasen 722 | 28% | 58 | 10 | | | |
| | A-3 | ultrasen 720 | 28% | 59 | | 77 | | |
| | A-4 | ultrasen 751 | 28% | 65 | | | | |
| | A-5 | ultrasen 681 | 20% | 72 | | | | |
| | A-6 | ultrasen 633 | 20% | 78 | | | | |
| | A-7 | ultrasen 631 | 20% | 80 | | | 60 | |
| | A-8 | ultrasen 638 | 20% | 82 | | | | |
| | A-9 | ultrasen 625 | 15% | 92 | | | | |
| | A-10 | ultrasen 541 | 10% | 94 | | | | 70 |
| wax (B) | B-1 | sasol H1 | | 110 | 10 | 20 | | |
| | B-2 | high wax NL800 | | 105 | | | | |
| | B-3 | biscol 660-P | | 145 | | | | |
| magnetic powder (C) | C-1 | JIP 300A-120 | | | 80 | 3 | 40 | 30 |
| | C-2 | C-100 | | | | | | |
| additive | | antioxidant | | | 0.1 | 0.1 | 0.1 | 0.1 |
| | | antiblocking agent | | | 0.1 | 0.1 | 0.1 | 0.1 |
| properties of magnetic material | | melt viscosity at 150° C. | | | 21000 | 100000 | 210000 | 260000 |
| | | softening point (° C.) | | | 75 | 85 | 150< | 150< |
| evaluation of fabric-like material | | spreadability of resin | | | x | ○ | Δ | Δ |
| | | attracting ability to magnet | | | ○ | x | ○ | ○ |
| | | heat resistance | | | ○ | ○ | ○ | ○ |
| | | followability along curved surface | | | x | ○ | x | x |
| | | integrating ability (immobilization force) | | | x | ○ | Δ | Δ |

With respect to the ethylene-vinyl acetate copolymer (A), the melting point in Tables 1 and 2 means a melt peak temperature.

Each component shown in Tables 1 and 2 is shown below.

A-1: ultrasen 760 (ethylene-vinyl acetate copolymer made by Tosoh Corporation, the content of vinyl acetate 42%, MFR 70 g/10 min. (190° C.×2, 16 kg), flexural modulus 1 MPa, melting peak temperature 50° C. or less)

A-2: ultrasen 722 (ethylene-vinyl acetate copolymer made by Tosoh Corporation, the content of vinyl acetate 28%, MFR 400 g/10 min. (190° C.×2, 16 kg), flexural modulus 10 MPa, melting peak temperature 58° C.)

A-3: ultrasen 720 (ethylene-vinyl acetate copolymer made by Tosoh Corporation, the content of vinyl acetate 28%, MFR 150 g/10 min. (190° C.×2, 16 kg), flexural modulus 10 MPa, melting peak temperature 59° C.)

A-4: ultrasen 751 (ethylene-vinyl acetate copolymer made by Tosoh Corporation, the content of vinyl acetate 28%, MFR 5.7 g/10 min. (190° C.×2, 16 kg), flexural modulus 20 MPa, melting peak temperature 65° C.)

A-5: ultrasen 681 (ethylene-vinyl acetate copolymer made by Tosoh Corporation, the content of vinyl acetate 20%, MFR 350 g/10 min. (190° C.×2, 16 kg), flexural modulus 20 MPa, melting peak temperature 72° C.)

A-6: ultrasen 633 (ethylene-vinyl acetate copolymer made by Tosoh Corporation, the content of vinyl acetate 20%, MFR 20 g/10 min. (190° C.×2, 16 kg), flexural modulus 30 MPa, melting peak temperature 78° C.)

A-7: ultrasen 631 (ethylene-vinyl acetate copolymer made by Tosoh Corporation, the content of vinyl acetate 20%, MFR 1.5 g/10 min. (190° C.×2, 16 kg), flexural modulus 40 MPa, melting peak temperature 80° C.)

A-8: ultrasen 638 (ethylene-vinyl acetate copolymer made by Tosoh Corporation, the content of vinyl acetate 20%, MFR 13 g/10 min. (190° C.×2, 16 kg), flexural modulus 30 MPa, melting peak temperature 82° C.)

A-9: ultrasen 625 (ethylene-vinyl acetate copolymer made by Tosoh Corporation, the content of vinyl acetate 15%, MFR 14 g/10 min. (190° C.×2, 16 kg), flexural modulus 50 MPa, melting peak temperature 92° C.)

A-10: ultrasen 541 (ethylene-vinyl acetate copolymer made by Tosoh Corporation, the content of vinyl acetate 10%, MFR 9 g/10 min. (190° C.×2, 16 kg), flexural modulus 80 MPa, melting peak temperature 94° C.)

<Wax (B)>

B-1: sasol H1 (Fischer Tropsch wax made by Sasol in South Africa, melting point 110° C.)

B-2: high wax NL800 (polyethylene wax made by Mitsui Chemicals, Incorporated, melting point 105° C.)

B-3: biscol 660-P (Sanyo Chemical Industries, Ltd., melting point 145° C.)

<Magnetic Powder (C)>

C-1: JIP300A-120 (magnetic powder made by JFE Steel Corporation)

C-2: C-100 (magnetic powder made by Powdertech Co., Ltd.)

<Additive>

Antioxidant: IRGANOX1010 (made by Ciba Specialty Chemicals)

Antiblocking agent: Incroslip C (made by Croda)

The resulting hot melt magnetic materials and the fabric-like materials for reinforcement in urethane foam molding were checked by performing following tests. The test results are also shown in Tables 1 and 2.

<Tests for Hot Melt Magnetic Material>

(Melt Viscosity Measurement)

The melt viscosity was measured by using a dynamic viscoelasticity measuring device Rheosol-G3000 made by UBM Co., Ltd. The measuring method includes disposing a simple cone having an diameter of 40 mm and an inclination angle of 2° above a measuring part, placing a simple plate having a diameter of 40 mm below the measuring part, holding a sample between the cone and the plate, keeping it at 150° C. for 15 min., and then measuring the melt viscosity of the sample with a shearing rate of 2.9 ($cm^{-1}$) while keeping the same condition.

(Evaluation of Spreadability of Hot Melt Magnetic Material)

A test piece of the hot melt magnetic material, which was formed in a cylindrical shape having the diameter of 5 mm and the height of 8 mm (the weight of 0.4 to 0.6 g), was placed on an iron stand. The test piece was covered with a piece of nonwoven fabric of organic fibers from above. A Teflon (R) film for separation was put on the nonwoven fabric. Then, the hot melt magnetic material was heated and melted by pressing the film from above for 2 seconds with an iron, temperature of which was controlled at 150° C. by using a temperature control dial, so as to evaluate the spreadability of the hot melt magnetic material.

◯: The hot melt magnetic material spread in a disc shape having the diameter of 15 mm or more.

Δ: The hot melt magnetic material spread in a disc shape having the diameter of 10 mm or more and less than 15 mm.

X: The hot melt magnetic material spread in a disc shape having the diameter of less than 10 mm.

<Evaluation of Fabric-Like Material for Reinforcement in Urethane Foam Molding>

(Attracting Ability (Adhesive Property) of Hot Melt Magnetic Material to Magnet)

The attracting ability (the adhesive property) was evaluated by bringing the hot melt magnetic material permeating into and immobilized in the fabric-like material for reinforcement into contact with a permanent magnet (2800 G) having the weight of 10 g and the diameter of 6 mm, and then lifting the fabric-like material.

◯: The magnet was completely lifted in the air.

Δ: The magnet was lifted, but dropped easily when touched lightly.

X: The magnet was not lifted.

(Heat Resistance)

The fabric-like material for reinforcement was put between a pair of aluminum plates and kept at 70° C. for 30 min. while applying a load of 2 kg to it. After taking it out, the aluminum plates were peeled off quickly. Then, transfer of the hot melt material to the aluminum plates was observed.

◯: The hot melt magnetic material did not transfer.

Δ: The amount of the hot melt magnetic material transferred to the aluminum plates was 20% or less.

X: The amount of the hot melt magnetic material transferred to the aluminum plates was 50% or more.

(Followability Along Curved Surface)

The fabric-like material for reinforcement was visually observed when bringing the hot melt magnetic material permeating into and immobilized in the fabric-like material for reinforcement into contact with a magnetic ball (a neodymium magnet, diameter 10 mm).

◯: The fabric-like material for reinforcement was deformed along a curved surface of the magnetic ball.

Δ: The fabric-like material for reinforcement was bent but was not deformed into a shape along the curved surface of the magnetic ball.

X: The fabric-like material for reinforcement was not deformed.

(Integrating Ability (Immobilization Force) of Hot Melt Magnetic Material with Fabric-Like Material for Reinforcement)

It was evaluated by peeling off the hot melt magnetic material immobilized in the fabric-like material for reinforcement by hand, and visually observing a damaged surface of the peeled nonwoven fabric.

○: The hot melt magnetic material could not be peeled off unless it is pulled forcibly. Alternatively, when the hot melt magnetic material was peeled off, the surface of the nonwoven fabric was severely damaged, e.g., generation of much fuzz or an opening.

Δ: The hot melt magnetic material could be peeled off with small force, and a little fuzz was observed on the surface of the nonwoven fabric.

X: The hot melt magnetic material could be easily peeled off without damage to the hot melt magnetic material, and the surface of the nonwoven fabric was not severely damaged.

<Result>

The hot melt magnetic material having the heat resistance and the flexibility could be obtained by using the hot melt magnetic material having the specific softening point of 70 to 100° C. corresponding to the feature of this disclosure, so that it was able to remarkably improve the followability of the fabric-like material for reinforcement in urethane foam molding along the curved surface. And, the followability of the fabric-like material for reinforcement in urethane foam molding along the curved surface was improved further by using ethylene-vinyl acetate copolymer (A) having the melt peak temperature of 50 to 70° C. The above description shows a fact that the fabric-like material for reinforcement in urethane foam molding containing the specific hot melt magnetic material of this disclosure solves a problem relating to the followability along the curved surface of the shaping mold.

The invention claimed is:

1. A material for reinforcement in urethane foam molding obtained by impregnating a part of a surface of a nonwoven fabric with a hot melt magnetic material and immobilizing the hot melt magnetic material,
wherein the hot melt magnetic material satisfies compositions described below and has a softening point of 70 to 100° C.:
Ethylene-vinyl acetate copolymer (A): 10 to 95 parts by mass
Wax (B): 0 to 30 parts by mass
Magnetic powder (C): 5 to 70 parts by mass;
wherein the total of the components (A), (B) and (C) is 100 parts by mass.

2. The material for reinforcement in urethane foam molding according to claim 1, wherein the hot melt magnetic material satisfies compositions described below:
Ethylene-vinyl acetate copolymer (A): 30 to 95 parts by mass
Wax (B): 0 parts by mass
Magnetic powder (C): 5 to 70 parts by mass;
wherein the total of the components (A), (B) and (C) is 100 parts by mass.

3. The material for reinforcement in urethane foam molding according to claim 1, wherein the hot melt magnetic material satisfies compositions described below:
Ethylene-vinyl acetate copolymer (A): 10 to 80 parts by mass
Wax (B): 3 to 30 parts by mass
Magnetic powder (C): 5 to 70 parts by mass
wherein the total of the components (A), (B) and (C) is 100 parts by mass.

4. The material for reinforcement in urethane foam molding according to claim 1,
wherein the content of vinyl acetate is 20 to 45 parts by mass with respect to 100 parts by mass of the ethylene-vinyl acetate copolymer (A).

5. The material for reinforcement in urethane foam molding according to claim 1,
wherein the melt peak temperature of the ethylene-vinyl acetate copolymer (A) is 50 to 70° C.

6. A method for producing a urethane foam molded body utilizing the material for reinforcement in urethane foam molding according to claim 1, comprising:
fixing the material for reinforcement in urethane foam molding on a molding surface of a shaping mold, which contains magnets buried in some predetermined positions, due to magnetic force,
injecting a urethane resin into the shaping mold and foaming the urethane resin to integrally mold the urethane resin with the material for reinforcement in urethane foam molding, and
removing a urethane foam molded body obtained by foam molding from the shaping mold.

* * * * *